Figure 1:

No. 887,160.  
PATENTED MAY 12, 1908.  
H. W. WEBB.  
FLEXIBLE WIRE SHAFT.  
APPLICATION FILED FEB. 8, 1907.

Witnesses:  
Inventor  
Hartwell W. Webb  
By his Attorney

UNITED STATES PATENT OFFICE.

HARTWELL W. WEBB, OF NEWARK, NEW JERSEY, ASSIGNOR TO WEBB MANUFACTURING COMPANY, OF NEWARK, NEW JERSEY, A CORPORATION OF NEW JERSEY

FLEXIBLE WIRE SHAFT.

No. 887,160.   Specification of Letters Patent.   Patented May 12, 1908.

Application filed February 8, 1907. Serial No. 356,449.

*To all whom it may concern:*

Be it known that I, HARTWELL W. WEBB, a citizen of the United States, residing at Newark, in the county of Essex and State of New Jersey, have invented certain new and useful Improvements in Flexible Wire Shafts; and I do hereby declare the following to be a full, clear, and exact description of the invention, such as will enable others skilled in the art to which it appertains to make and use the same.

The object of my invention is to produce a flexible shaft having two or more helices of opposite hand or direction of winding in which freedom of motion is provided between the adjacent, superjacent and subjacent coils.

Many flexible shafts heretofore in commercial use are subject to grave defects. When caused to rotate in a curved position, the friction between the various superposed layers of wire becomes excessive and rapidly causes heating of the shaft with injury thereto, and corresponding loss of power. Ordinary flexible shafts are not commonly used to advantage when bent in a curve whose radius is less than twenty times the diameter of the shaft.

My improved flexible shaft can be used to advantage when bent in a curve or circle whose radius is but ten times the diameter of the shaft, because in my improved shaft there is free play between the adjacent, superjacent and subjacent coils of wire.

Heretofore, the flexible shafts in commercial use have usually had central cores of twisted wire, which cores when the shafts are rotated in curved positions are subjected as units to alternate compression and tension as each shaft revolves. This sets up crystallization and eventually causes the distortion of the said core. My improved shaft has no solid core or central member to be affected in this manner.

My improved shaft consists of a helical coil of wire composed of four or more or less wires laid side by side, extending in a direction parallel or nearly so to the torsional force to be applied. Around and upon this coil is a similar helical coil of an equal number or more or less of wires laid side by side and of opposite hand or direction of winding. These coils are not allowed to bind one upon another, but permit adequate play of the parts and lubrication when the shaft is rotated in a curved position. Other coils may or may not be wound about the two inner coils in the same manner, the hand or direction of winding of the helices alternating with each superjacent coil.

I find empirically that the diameter of the wires to be used in a shaft of say four layers of four wires each, should preferably be about one tenth of the diameter of the finished shaft.

Preferably, my improved shaft is made by the process described and claimed in my pending application Serial No. 364,735 filed March 26, 1907.

Figure 2:
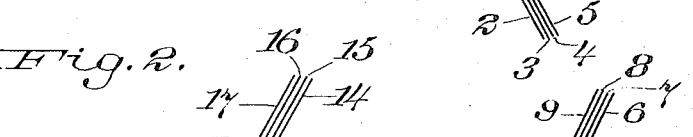
Figure 3:
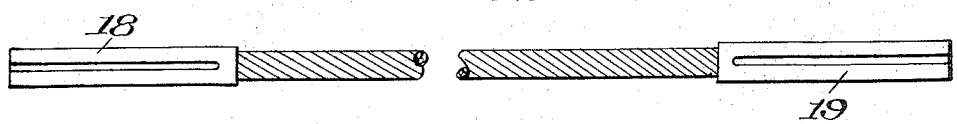

A flexible shaft made in accordance with my invention is illustrated in the various stages of manufacture in the accompanying sheet of drawings in which:

Figure 1 represents the winding of the first layer of wire on a mandrel. Fig. 2 represents a completed shaft partly unwound to show the arrangement of the several layers of wire. Fig. 3 represents a completed shaft with ends capped with suitable couplings ready for use. Figs. 4, 5, 6 and 7 are exaggerated illustrative views to show the conditions of the wire helices at different periods in the process of manufacture.

Throughout the drawings, like reference figures indicate like parts.

1 is a mandrel used in forming the first coil out of four wires marked 2, 3, 4, and 5. A second coil is composed of wires 6, 7, 8 and 9 wound in the opposite direction on the first coil after the mandrel 1 has been removed. Other coils formed of wires 10, 11, 12 and 13, and 14, 15, 16 and 17, may be added. The shaft so formed has end pieces 18 and 19 fastened to its extremities, as shown in Fig. 3. These end pieces may be brazed or otherwise fastened to the wires and serve to hold the ends of the wire coils together and also afford means for coupling the shaft to its work. A detail of the ordinary shaft so formed is shown in exaggerated cross section and side elevation in Figs. 4 and 5.

Figure 6:
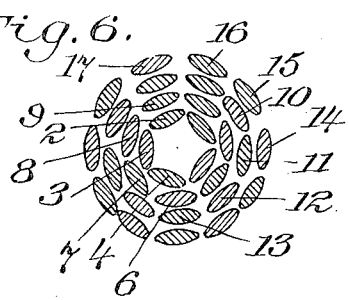
Figure 7:
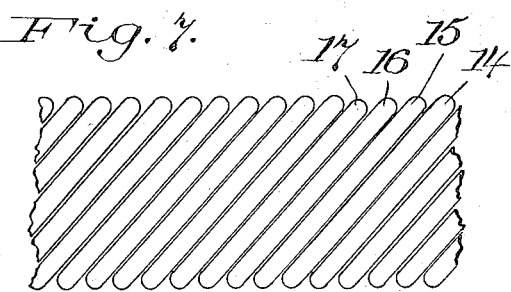

In my improved shaft formed according to the process described in my companion application No. 364,735, above referred to, or by an equivalent process the individual coils of each helix are separated by a slight distance from the adjacent coils of the same diameter and from the adjacent coils of the next inner or outer helix, as shown in Figs. 6 and 7.

which are exaggerated detail views of a portion of one of my improved shafts.

Figure 4:
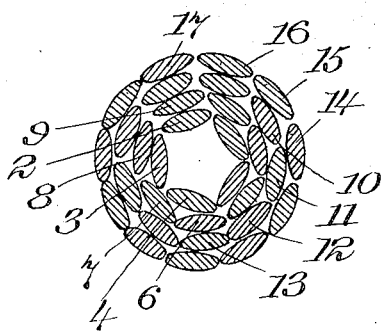
Figure 5:
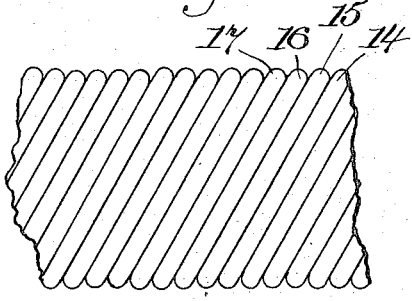

In the ordinary shaft shown in Figs. 3, 4 and 5 there is a tendency for the coils to unwind when removed from the winding machine and each coil then presses outwardly against the next one. These pressures produce friction and heat when the shaft is operated in a curved position and also cause a resistance to the bending of the shaft to a curve of small radius.

In my improved shaft additional flexibility results from the structure illustrated in Figs. 6 and 7. The several coils, if not permanently separated by the process of stretching described in my said application No. 364,735, or equivalent means, are thereby relieved from all pressure one upon the other. Hence but little friction and heat are developed when the shaft is rotated in a bent position and a great improvement in efficiency and life of the shaft results.

Having, therefore, described my invention, what I claim as new is:

1. A flexible shaft comprising in combination two helical coils of wire wound one upon the other, each coil of each helix being separated by a slight distance from the adjacent coils of the same diameter and from the adjacent coils of the next inner or outer helix.

2. A flexible hollow shaft composed of a plurality of helical coils of wire wound one upon another, each coil of each helix being separated by a slight distance from the adjacent coils of the same diameter and from the adjacent coils of the next inner and outer helices.

3. A flexible shaft comprising in combination a plurality of helical coils of wire wound one upon another, each coil of each helix being separated by a slight distance from the adjacent coils of the same diameter and from the adjacent coils of the next inner and outer helices, the adjacent helices being wound in opposite directions.

4. A flexible hollow shaft composed of a plurality of helical coils of wire wound one upon another, each coil of each helix being separated by a slight distance from the adjacent coils of the same diameter and from the adjacent coils of the next inner and outer helices, each helix being wound in a direction opposite to that in which the next inner and outer helices are wound.

5. A flexible hollow shaft comprising in combination a plurality of strands of wire wound in the same direction in helical coils of uniform diameter, and a plurality of strands of wire wound in the opposite direction in helical coils of uniform but lesser diameter located within the first mentioned helices, each coil of each helix being separated by a slight distance from the adjacent coils of both the same and different diameters.

In testimony whereof I affix my signature, in presence of two witnesses.

HARTWELL W. WEBB.

Witnesses:
D. V. PIERPOINT,
E. V. C. PARKINS.